United States Patent [19]

Cherenko et al.

[11] 4,086,595
[45] Apr. 25, 1978

[54] BILAYER WINDSHIELD WITH EMBEDDED ANTENNA

[75] Inventors: Joseph P. Cherenko, Valencia; Hugh E. Shaw, Jr., New Kensington, Pa.

[73] Assignee: PPG Industries, Inc., Pittsburgh, Pa.

[21] Appl. No.: 510,830

[22] Filed: Sep. 30, 1974

Related U.S. Application Data

[63] Continuation-in-part of Ser. No. 400,765, Sep. 26, 1973, abandoned.

[51] Int. Cl.² ............................................. H01Q 1/28
[52] U.S. Cl. .................................................. 343/713
[58] Field of Search ........................ 343/711, 712, 713

[56] References Cited

U.S. PATENT DOCUMENTS

3,414,902  12/1968  Shaw ................................. 343/713

Primary Examiner—Eli Lieberman
Attorney, Agent, or Firm—Edward I. Mates

[57] ABSTRACT

A laminated glass-plastic antenna windshield having an elongated conductive element, such as a wire embedded in preferred positions by a thermoplastic polyurethane layer, which is the plastic layer of the laminated antenna windshield. The antenna windshield has a higher Q-value than similar laminated antenna windshields provided with a layer of polyvinyl butyral to carry the elongated electroconductive element and those that carry the wire in positions other than said preferred positions.

4 Claims, 5 Drawing Figures

BILAYER WINDSHIELD WITH EMBEDDED ANTENNA

Cross-Reference to Related Applications

This application is a continuation-in-part of U.S. application Ser. No. 400,765 of Joseph P. Cherenko and Hugh E. Shaw, Jr., filed Sept. 26, 1973 for ANTENNA WINDSHIELD, now abandoned.

BACKGROUND OF THE INVENTION

This invention relates to antenna windshields and particularly to those of laminated glass or other rigid transparent glazing material such as polycarbonates, acrylics and polyesters, laminated to a layer of flexible plastic that has an elongated electroconductive element embedded therein. The electroconductive element is preferably a wire covered by a moisture-impervious, non-electroconductive sheath. The wire is adapted to be coupled to a radio in a vehicle in which the windshield is installed so that the wire serves as an antenna for the radio.

Laminated antenna windshields comprising a pair of matched glass sheets laminated to opposite sides of an interlayer of polyvinyl butyral in which one or more electroconductive wires are embedded in the interlayer have served as antennas for radios installed in automobiles. Using the laminated windshield to support the antenna has improved the styling of automobiles by eliminating the whip antenna that extended from the vehicle body. Its use has also avoided a source of vandalism—the snapping of the antenna from the automobile.

Several patents have been issued on laminated antenna windshields. These include U.S. Pat. No. 3,208,070 to Boicey, U.S. Pat. Nos. 3,484,583 and 3,484,584 to Shaw, U.S. Pat. Nos. 3,543,272 and 3,638,225 to Zawodniak, 3,549,785 to Timko, 3,576,576 to Jensen, 3,579,243 to Dickason, 3,599,214 to Altmayer, 3,615,986 and 3,618,102 to Dickason and Richardson, 3,680,132 to Tolliver, and 3,728,732 to Igarashi. All of the aforesaid patents illustrate laminated antenna windshields having antenna wires embedded in an interlayer of polyvinyl butyral which is sandwiched between a pair of glass sheets.

The Tolliver patent, assigned to the same assignee as the present case, suggests using polyurethane or polyvinyl butyral as an interlayer material in an antenna windshield, but does not specify any particular position of the antenna wire relative to the inner and outer glass sheets. Furthermore, none of the patents in the laminated antenna windshield art either suggested or made obvious a laminated antenna windshield of the so-called bilayer type where one layer is composed of a sheet of glass or other rigid transparent glazing material and the other layer is composed of a preformed sheet of thermoplastic polyurethane into which an elongated antenna element is embedded in close adjacency to the glass sheet.

A suitable measurement of the performance of an antenna windshield is its so-called Q-value. The Q-value is an important characteristic of any tuned circuit and is defined as the ratio between the amount of energy stored in the circuit and the amount of energy lost. A standard test has been devised using a Q-meter tuned to a frequency of 1 megahertz. The Q-meter is connected in place of the automobile radio to a so-called pig tail wire electrically connected to the antenna wire of the antenna windshield. A commercially available Q-meter suitable for use in this standard test is manufactured by Hewlett Packard and sold under the Boonton Radio trademark as type 260-A.

Each antenna windshield tested is mounted in the frame of an automobile so that the windshield occupies the same position it would normally occupy when permanently installed in the automobile. The Q-meter test has been used to evaluate many changes proposed in the past for antenna windshield configurations. As will be disclosed later in this specification, the teaching of the present invention has resulted in antenna windshields having higher Q-values and better radio reception than conventional laminated antenna windshields composed of two glass sheets and an interlayer of polyvinyl butyral.

SUMMARY OF THE INVENTION

The present invention provides laminated antenna windshields having higher Q-values and better radio reception than present commercial antenna windshields comprising two sheets of glass and an interlayer of polyvinyl butyral by mounting the antenna wire in a preferred position within a polyurethane interlayer of the type that also provides safety glass with superior impact-resistant properties over a wide range of temperatures and to cause less lacerative injury than safety glass containing polyvinyl butyral interlayers. Furthermore, when properly assembled according to the present invention, bilayers comprising a single sheet of glass and a single sheet of preformed polyurethane resin in which the polyurethane sheet supports an antenna wire, have Q-values that are surprisingly high, particularly when the antenna wire is encased in a water-impervious, non-electroconductive sheath, such as enamel, and is embedded within the polyurethane sheet closer to the interface between the polyurethane sheet and the glass sheet than to the opposite polyurethane surface. The term "bilayer" as used herein excludes a second sheet of glass, but may include or exclude a thin protective film over the polyurethane surface facing away from the glass. Surprisingly, in antenna windshields comprising a pair of glass sheets and an interlayer of polyurethane, the Q-value is significantly better when the antenna wire is embedded within the polyurethane interlayer closer to the inner glass sheet than to the outer glass sheet of the installed windshield. Thus, the present invention provides different criteria for embedding an antenna wire within the thickness of a polyurethane layer when the latter forms part of a bilayer windshield than for a polyurethane layer that serves as an interlayer bonding two glass sheets together.

The present invention will be understood more clearly in the light of a description of particular embodiments, which follow.

BRIEF DESCRIPTION OF THE DRAWINGS

In the drawings forming part of the description of illustrative embodiments, wherein like reference numbers refer to like structural elements.

DESCRIPTION OF THE PREFERRED EMBODIMENT

Referring to the drawings, reference number 11 refers to a laminated windshield comprising an outer glass sheet 12, an inner glass sheet 14 of matching curvature and an interlayer 16 of thermoplastic material, preferably a preformed sheet of polyester type of polyurethane of the type to be described later in detail. In the usual automobile windshield, the outer and inner glass sheets 12 and 14, respectively, are curved and have an outline conforming to the windshield frame in which the laminated windshield is installed. The outer glass sheet 12 has a surface facing away from the interlayer that is convexly curved while the inner glass sheet 14 has a surface facing away from the interlayer that is concavely curved. In present day commercial windshields, the glass sheets are of equal thickness. Either glass sheet may be composed of annealed plate, float or sheet glass or one or both glass sheets may be tempered as suggested in U.S. Pat. No. 3,396,075 to Morris.

Each glass sheet has a thickness of 0.05 to 0.25 (1.27–6.35 mm) while the interlayer has a thickness of 0.005 to 0.06 inch (0.127–1.524 mm). An elongated wire 18, having a thickness of .0001 inch to 0.005 inch (0.0254–0.127 mm), but less than that of said interlayer, and comprising a pair of transverse elements extending across the width of the center of the windshield and longitudinally extending portions extending away from the transverse elements and each other, is embedded within the interlayer 16 except for a loop 19 which extends outside of the interlayer sheet for folding into a notched portion 20 along a longitudinal lower side edge of the outer glass sheet 12. In a typical commercial windshield, each glass sheet is 0.09 to 0.12 inch (2.286–3.048 mm) thick and the interlayer is 0.03 inch (0.0762 mm) thick. However, the glass sheets may be of different thicknesses, with the outer sheet thicker, if desired, and one or both glass sheets may be strengthened by chemical tempering as in U.S. Pat. No. 3,396,075 to Morris, if desired.

The wire 18 is preferably a 36 gauge copper wire encased in a water-impervious, non-electroconductive, enamel sheath and has a maximum diameter of 0.005 inch (0.127 mm) so as to be virtually invisible to an occupant. It is arranged in the laminated windshield in symmetrical arrangement relative to an axis extending transversely across the mid-point of the windshield. The wire can be arranged in any well known manner, but in the illustrative embodiments, comprises the usual dipole arrangement with two L-shaped elements disposed in a mirror relation as depicted in the drawings.

A metal tab 22, preferably a thin shim of copper about 10 mils (0.254 mm) thick connected at 23 to a lead-in wire 24 which terminates in a plug 26, is inserted within the notched portion of the outer glass sheet 12 and adheres to the interlayer 16. The lead-in wire 24 is insulated except for its extremity portion that is connected to the metal tab 22 to which it is securely welded or soldered or otherwise securely fastened sufficiently strongly to withstand a pull of more than 10 pounds without failure.

The interlayer sheet 16 has the wire 18 embedded therein by using the apparatus depicted in FIGS. 3 and 4 of U.S. Pat. No. 3,543,272 of Zawodniak. The disclosure of the aforesaid wire embedding apparatus taken from the latter patent is incorporated by reference in the present specification.

The plastic interlayer material 16 is selected from those materials which are flexible, optically transparent and are somewhat abrasion resistant. Further, the plastic interlayer materials, when laminated to glass to form the windshield of this invention, should minimize the dangers of both lacerative and concussive injuries. To fulfill these latter two requirements, the plastic interlayer material should be flexible, should have a good tensile strength and should adhere well to glass at ambient conditions. The plastic interlayer should be flexible such that when the windshield is impacted by a passenger's head cracking the glass, the plastic interlayer can stretch and act as a diaphragm, thereby absorbing impacting energy and minimizing concussive injury. The plastic interlayer should have good tensile strength to minimize tearing, thereby providing resistance to penetration of the closure.

Accordingly, the plastic sheeting material should have abrasion resistance as measured by A.N.S.I. Code Z 26.1 Test No. 18 for plastics, of no more than 15 percent increase in haze after 100 Taber cycles on a Taber abraser. For flexibility, the plastic interlayer should have a relatively constant Gehman modulus between about $-20°$ and $50°$ C. of $10^{9.5}$ log of 3 times the shear modulus in dynes per square centimeter, as measured according to A.S.T.M. D-1053-65. The plastic interlayer should have a tensile strength of at least 1000 psi (29.26.4 Kg/cm$^2$), preferably 2000 to 5000 psi (5852.8–14632 Kg/cm$^2$), as measured by A.S.T.M. D-638-64T. For adherence, the plastic interlayer material should laminate to the strengthened glass sheet with a bond strength of 10 to 200, preferably 20 to 50, pounds per lineal inch, (1786 to 35720, preferably 3572 to 8930 gm/cm), as measured by the 90° Peel Test according to a slightly modified A.S.T.M. D-1876-61T procedure. The modification to the A.S.T.M. procedure consists of imposing a stainless steel wire screen in the exposed surface of the plastic. The purpose of the screen is to prevent the plastic interlayer from stretching as it is peeled from the surface.

Besides the plastic interlayer material having the above physical properties, the laminated vehicle closure of glass and a flexible plastic ply should have certain physical properties in the combined laminated configuration. Minimum standards for motor vehicle glazing are determined in accordance with the procedures described in the A.N.S.I. Code Z 26.1 tests. Therefore, the laminated structures contemplated by this invention have the following physical properties when tested according to the procedure set forth in the A.N.S.I. Code Z 26.1 test.

Table I

| Properties of Laminated Windshields Prepared as Contemplated by the Invention | | |
|---|---|---|
| A.N.S.I. Code Z 26.1 Test Number | Property Measured | Result |
| 1 | Light Stability | Samples are unaffected[1] by 117 hours exposure to ultraviolet light |
| 2 | Luminous Transmittance | > 70% |
| 9 | Impact Strength (Dart) | No penetration |
| 12 | Impact Strength (ball ½ pound) | No penetration |
| 15 | Optical Deviation and Distortion | Not observable at specified normal |

Table I-continued
Properties of Laminated Windshields
Prepared as Contemplated by the Invention

| A.N.S.I. Code Z 26.1 Test Number | Property Measured | Result |
| --- | --- | --- |
| 26 | Penetration Resistance[2] | angle of incidence No penetration |

[1]Samples did not visibly yellow nor lose visible transmittance.
[2]Test slightly modified by clamping the bilayer structure to the frame when the plastic side was impacted.

Plastic interlayer compositions which have been found to possess the above characteristics are polyurethane resins, both thermoplastic and thermosetting type, with the thermoplastic type being preferred. Thermoplastic polyurethanes are available as preformed sheets, whereas the thermosetting polyurethanes are usually cast as a liquid against a glass sheet and cured in place while held in such a relation to the glass. However, when thermosetting polyurethanes are cast against materials having non-adherent surfaces and baked to a polymerized state and separated from said surfaces, the resulting sheets are also suitable as interlayer compositions for laminated antenna windshields.

The polyurethane materials are particularly useful because of their flexibility and good tensile properties. Further, they are transparent, have good abrasion resistance, are impervious to atmospheric conditions and maintain a strong laminate bond with glass for indefinite periods of time. By thermoset-type polyurethane is meant one in which there is significant cross-linking among polyurethane chains. Such cross-linking occurs, for example, in the curing of so-called polyurethane "prepolymers", which are linear, isocyanate-terminated polycarbamate esters of a diisocyanate and a diol, with a tri-functional curing agent such as a glycol having three or more hydroxyl groups and/or a polyamine having three or more amino groups. A thermoplastic polyurethane is one which contains only substantially linear polyurethane chains with essentially no, or only minimal, cross-linking among the chains. The thermoplastic polyurethanes flow under the influence of heat and pressure and can be therefore extruded or calendered in sheet form. The thermoset polyurethanes, because of branching and/or cross-linking among the individual polymer chains, do not flow well under the influence of heat and pressure, and if extruded or calendered, have extrusion lines and roll marks from calendering. The lines and roll marks cause distortion and haze in the transparent plastic, making them unacceptable for bilayer motor vehicle windshield applications. Thus, thermoset polyurethanes must be either cast as a liquid and cured in place against the outer strengthened glass, or precast in an environment which gives a preformed sheet with uniform thickness and no optical distortion.

Polyurethanes of the thermoset type are described in U.S. Pat. No. 3,509,015, which is hereby incorporated by reference, and are typically the reaction product of an organic polyisocyanate and a glycol, which is cross-linked with an organic compound having at least three active hydrogen atoms. Preferably, an isocyanate-terminated "prepolymer" which is formed from the reaction of an organic polyisocyanate and a glycol is first formed. This "prepolymer" forms one package of a two-package system. The curing agent forms the other package. Immediately before use, the two packages are mixed.

The preferred thermoplastic types of polyurethanes are prepared by reacting an organic polyisocyanate with a long chain glycol and a compound containing two active hydrogen atoms per molecule reactive with the isocyanate groups. Reaction is conducted until a solid, but still thermoplastic material is obtained. Then the reaction is interrupted, and the plastic is extruded, calendered or pressed into a sheet. Thermoplastic polyurethanes and manufacturing techniques are described in Belgian Pat. No. 785,125, assigned to the assignee of this invention, the disclosure of said Belgian patent being herein incorporated by reference.

Other polyurethanes that may be employed in laminated windshields of the present invention are prepared by polymerizing a polycaprolactone, e.g., epsilon-caprolactone, with an aliphatic diol, e.g., 1,4-butane diol. Still other polyurethanes based on polycarbonate diols rather than polycaprolactone and other polyester diols may also be used in the laminated windshields of the present invention. Belgian Pat. No. 792,203 discloses suitable polyurethanes prepared from polycarbonate diols and their method of preparation.

Thus, for example, the organic polyisocyanates that can be employed are the various organic compounds containing two or more isocyanate groups, or mixtures of such compounds, including aromatic, aliphatic and cycloaliphatic diisocyanates and tri-isocyanates and combinations of these types. Examples of various organic polyisocyanates which can be used in making the thermoplastic polyurethanes are those described above for use in making the thermosetting type of polyurethanes. Preferred organic polyisocyanates are dinuclear cyclic aliphatic diisocyanates, such as 4,4'-isopropylene-bis(cyclohexyl isocyanate) and 4,4'methylene-bis-(cyclohexyl isocyanate), the latter being commercially available in a 55:45 (percent by weight) trans:cis stereoisomer mixture from du Pont Chemical Company under the trademark HYLENE W.

The long chain glycol used in making the thermoplastic polyurethanes are hydroxy-terminated polyesters having a molecular weight of from about 500 to 20,000, preferably about 750 to 5,000 and optimally about 1,000 to 3,300.

The hydroxy-terminated polyester is formed by polyesterifying a polycarboxylic acid and a polyhydric alcohol. Since the polyesters are hydroxy-terminated, they should be prepared such that there is an excess of polyol to polyacid. Preferably, a molar ratio of more than one polyol to polyacid should be used. Reaction conditions for polyesterifications which include time, temperature, ratio of ingredients and catalyst usage are well known in the art and can be found in the following references: *Unsaturated Polyesters Structures and Properties* by H. V. Boenig, Elsevier, New York 1964 and *Polyesters and Their Applications,* Bjorksten Research Laboratories, New York, Reinhold 1956.

The hydroxy-terminated polyesters used in making the thermoplastic polyester polyurethanes are preferably the esterification products of an aliphatic dibasic acid or anhydride with an aliphatic diol. Suitable aliphatic dicarboxylic acids are alkylene dicarboxylic acids having 4 to 14 carbon atoms in which the alkylene radical may be, for example, adipic, succinic, pimelic, suberic, azelaic or sebacic moieties. Besides the saturated species, unsaturated dicarboxylic acids or anhydrides such as maleic acid, maleic anhydride, fumeric acid and itaconic acid can also be used.

The aliphatic diols are preferably saturated and contain from 2 to 15 carbon atoms. Examples include ethylene glycol, 1,3-propane diol, and 1,4-butane diol.

The preferred hydroxy-terminated polyester is poly-1,4-butylene adipate having a molecular weight of from about 1,000 to 3,300.

Besides the hydroxy-terminated polyesters, the organic polyisocyanates also react with an additional compound containing at least two active hydrogen atoms as determined by the Zerewitinoff test, which is described in the Journal of the American Chemical Society, Volume 49, page 3181 (1927).

The compounds containing the active hydrogen groups which are reactive with the isocyanate moieties preferably contain only two active hydrogen atoms and are the aliphatic diols containing from about 2 to 15 carbon atoms inclusive. Examples include a saturated aliphatic diol such as ethylene glycol, 1,3-propane diol, and 1,4-butane diol.

Besides the preferred aliphatic diols, amine or amine-diol mixtures which contain at least two, and preferably only two, active hydrogen atoms per molecule can be used as the active hydrogen-containing compound.

The amines which can be employed can be primary or secondary diamines in which the radicals attached to the nitrogen atoms can be saturated or unsaturated aliphatic or alicyclic radicals. Also, the radicals can be aromatic, aromatic-substituted aliphatic, aliphatic-substituted aromatic or heterocyclic radicals, as may be desired. Examples of suitable aliphatic and alicyclic diamines are the following: 1,2-ethanediamine, 1,3-propanediamine, 1,4-butanediamine, diaminopropyltetramethylenediamine, and isophoronediamine.

Aromatic diamines such as the phenylene diamines and the toluene diamines can be employed. Exemplary of the aforesaid amines are: m-phenylenediamine and p-tolylenediamine.

The thermoplastic polyurethanes can be prepared in several ways. The so-called "prepolymer method" offers selective control of the polymerization steps. By this method, the polyester is first reacted with an excess of diisocyanate to give an intermediate molecular weight adduct or "prepolymer". The prepolymer can then be polymerized (chain-extended) with diols, diamines or other active hydrogen compounds. Some minimal cross-linking can be tolerated by the use of a minor portion of some triol or other trifunctional material in the curing step. If the thermoplastic polyurethane is to be extruded into sheet form, the amount of cross-linking should be minimal since cross-linking will inhibit the polymer from flowing under the heat and pressure of extrusion. As a consequence, extruding a polyurethane with substantial cross-linking will result in an optically distorted sheet.

In addition to the prepolymer route where the reaction of isocyanate with polyester is completed before the active hydrogen compound (alternatively referred to herein as "curing agent") is added, all components may be mixed simultaneously in a so-called "one-shot" process. This method is generally satisfactory when all active hydrogens react at about the same rate such as when all contain hydroxyl groups as the only reactive sites. When a diamine active hydrogen curing agent is included, however, the procedure is usually successful only if special catalysts are added to selectively catalyze the reaction with hydroxyl groups so that their reactivity becomes similar to that of the amine groups. Otherwise, the diamine reacts first forming a polyurea which separates from the reaction mixture. Particularly useful catalysts are the tin catalysts such as dibutyltin dilaurate and stannous octoate.

For optimum results, the water content of the hydroxyl-terminated reactants should be as low as possible, since the isocyanate moieties are moisture sensitive.

The isocyanate reaction should generally be conducted under anhydrous conditions with dry reactants, such as in a nitrogen atmosphere, at atmospheric pressure and at a temperature of between about 70° C. and about 200° C. The reaction is conducted until there is essentially no free isocyanate or hydroxyl groups (i.e., less than about 0.7 percent and preferably less than 0.3 percent by weight NCO).

Catalysts, although not required for all reactions are preferably employed such as, for example, the aforementioned tin catalysts, dibutyl tin dilaurate and stannous octoate. UV absorbers, such as 2,4dihydroxy benzophenone or a substituted benzotriazole sold commercially Geigy Chemical Corp. under the trademark TINUVIN are preferably employed for the aromatic diisocyanates but are generally not required for the more stable aliphatic diisocyanates. Thermal stabilizers may be required for some of the compositions such as, dilauryl thiodipropionate and the hindered phenols.

The processing conditions which may be used and the final polymer properties will govern the choice of curing agent. When the "prepolymer" method is employed, the "prepolymer" is preferably heated to a temperature which will be above the melting point of the curing agent and which will reduce the prepolymer viscosity to a few hundred or at most a few thousand centipoises so as to aid in mixing and prevent solidification of the curing agent. The curing agent is usually heated above its melting point also. The mixing of the prepolymer with curing agent is a critical step and the agitation should be excellent.

Similar or superior results can be obtained by the "one-shot" method if the exotherm is properly controlled and if the relative rates of reactions of all components are adjusted to be nearly the same. Otherwise, a catalyst must be employed.

After reaction is substantially complete, the polymer is preferably transferred directly to an extruder and extruded and/or milled and calendered to the desired thickness or the partially polymerized material can be further polymerized in the forming equipment. When it is not possible to make a direct transfer from the reaction apparatus to the forming apparatus, the polyurethane material can be poured into trays and the like and allowed to harden into blocks. The trays are preferably coated with an extruded sheet of the same urethane material so that the polymer does not adhere to the tray, or removal is sometimes difficult. Suitable coating materials are halogenated hydrocarbons, such as halowax and polytetrafluoroethylene, sold commercially by du Pont under the trademark TEFLON. The polymer can then be processed when desired; and, where the processing requirement requires smaller pieces, the polymer is preferably cut while warm to permit the polymer to be more easily cut and cooled to make granulation easier. Conventional rubber mills, calendering rolls such as described in U.S. Pat. No. 2,156,584, and extruders can be employed to form the polymer into sheet form. The material is then preferably sandwiched between a non-adherent protecting material, such as polyethylene, to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in the polymer such as by drying in an oven at a temperature of between about room temperature and about 120° F. for from a few hours up to about 3 days or more. Before lamination, the powder, if employed, can be removed in a water bath, and the sheet dried. The polyurethane can then be placed with other materials to form the desired laminate.

Preferably, the preformed polyurethane sheet used to support the antenna wire is composed of a polyurethane composition of the type disclosed in Belgian Pat. No. 785,125. The polyurethane comprises a polymer having a numerical excess of linkages over the total of any other non-hydrocarbon linkages contained therein and having a pair of groups reactive with isocyanate or isothiocyanate groups, said polymer having an average molecular weight between about 500 and about 20,000; a diisocyanate, diisothiocyanate or compound having both an isocyanate and isothiocyanate group; and a compound containing at least two active hydrogens per molecule reactive with isocyanate or isothiocyanate groups having a molecular weight of less than about 250. The method of preparing preformed sheets of such polyurethane compositions is described in said Belgian Pat. No. 785,125, the disclosure of which is incorporated by reference in this specification.

The wire laying apparatus disclosed in U.S. Pat. No. 3,543,272 of Zawodniak is used to embed the wire 18 into the preformed sheets 16 of polyurethane resin according to the pattern desired for the antenna windshield. The sheets of polyurethane are stored with the embedded wire in a room of controlled temperature and humidity until needed for lamination. A typical storage room for these sheets is kept at approximately 70° F. and a maximum relative humidity of 20%.

Figure 1:
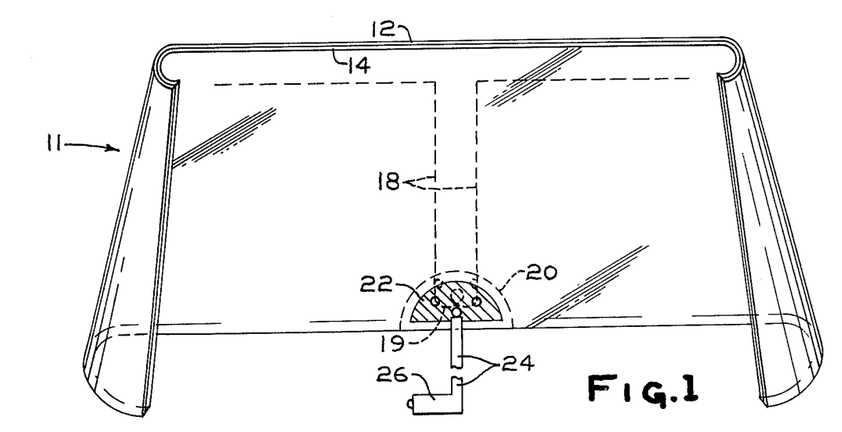
FIG. 1 is a perspective view of an antenna windshield conforming to the present invention looking at the windshield from within a vehicle.
Figures 2, 3, 4, 5:
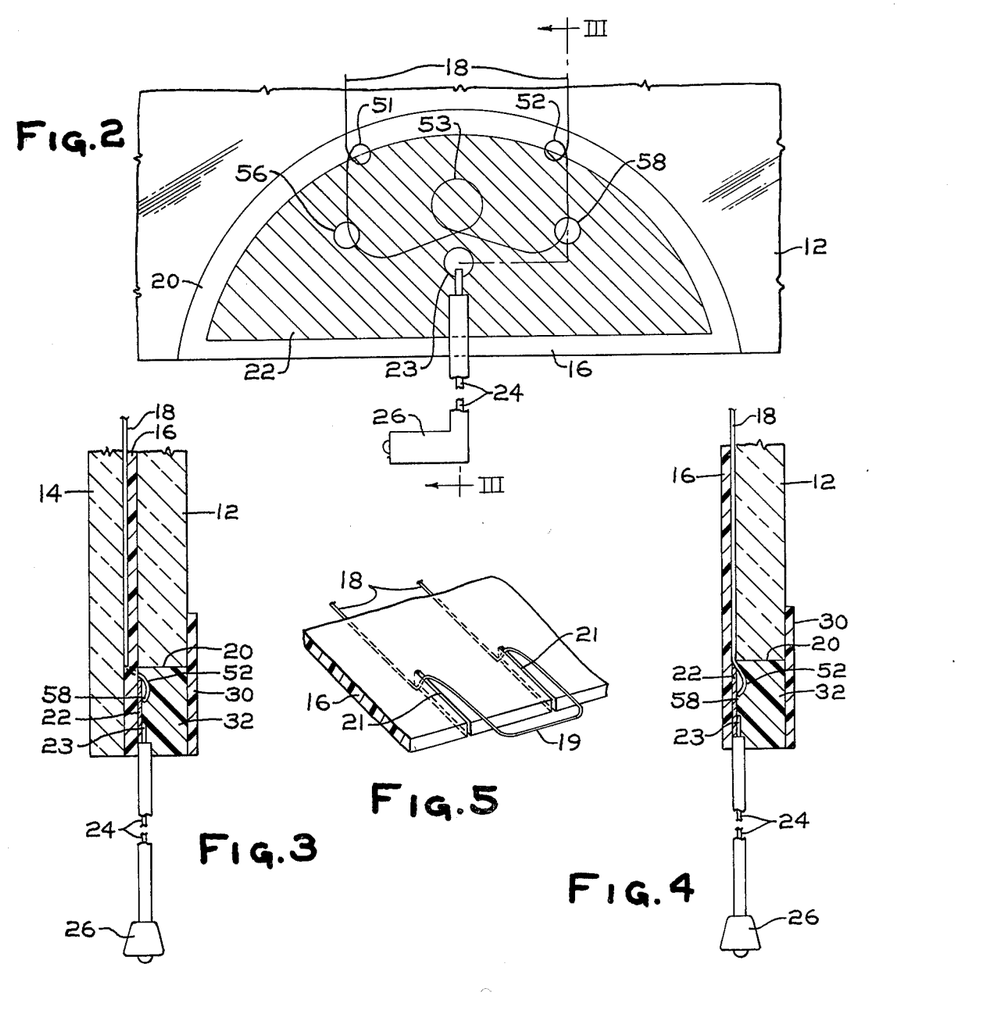
FIG. 2 is an enlarged view of a critical portion of said windshield depicted in FIG. 1 looking at the windshield portion from outside the vehicle.
FIGS. 3 and 4 are enlarged sectional views of two embodiments of the present invention taken along the lines III—III of FIG. 2.
FIG. 5 is a view showing how to mount an antenna wire portion in the interlayer of one of said embodiments.

In forming the laminated antenna windshield of FIGS. 1 to 3, a pair of glass sheets of matching outline is mounted on a bending mold of outline configuration and concave elevation, such as depicted in U.S. Pat. No. 3,248,196 to McKelvey, and the glass is heated sufficiently to sag onto the shaping surface. A suitable parting material, such as a suspension of finely divided diatomaceous earth in water as suggested in U.S. Pat. No. 2,725,320 to Atkeson and Golightly, is applied to an interfacial surface to prevent the glass from fusing together during bending. One of the glass sheets is notched along one longitudinal edge and the other sheet is stacked over the notched sheet and supported on a bending mold. After the sheets are heated and bent, they are cooled at a controlled rate and then removed from the mold when cool enough to handle.

The sheets of polyurethane plastic containing the wire embedded close to one surface are stacked horizontally. The glass sheets of a bent pair are then separated, and the unnotched glass sheet 14 is mounted with its concave surface downward over a support of convex elevation. The plastic sheet is then placed in alignment over the unnotched glass sheet 14 with said one surface on sheet 14, and the notched glass sheet 12 aligned over the plastic sheet 16. The assembly so formed has the wire embedded within the thickness of the polyurethane plastic sheet in closer spacing to the unnotched glass sheet 14 than to the notched glass sheet 12. Since the notched glass sheet 12 becomes the outer glass sheet of the laminated windshield, it is inherent that the wire is located closer to the inner glass sheet than the outer glass sheet of the laminated windshield. Two slits 21 (FIG. 5) are cut in the plastic sheet to pass the loop 19 of exposed wire through the plastic sheet 16. The plastic sheet is trimmed to have its outline conform to that of unnotched glass sheet 14 with the loop 19 of exposed wire 18 carefully held to prevent its being cut during the plastic trimming and slitting.

The glass-plastic assembly so formed is prepressed and laminated. A preferred prepressing apparatus used is described and claimed in U.S. Pat. No. 3,351,001 to Anthony A. Achkio, assigned to PPG Industries, Inc. and comprises a pair of nipper rolls which force out fluid from the interfaces between the sheets comprising the assembly.

After prepressing and before final lamination, a thin metal tab 22 of a highly conductive metal such as copper having a lead-in wire 24 and a plug 26 for a radio receiver attached thereto is pressed against the portion of the interlayer sheet 16 that faces the notched portion 20 of notched sheet 12. The central portion 19 of the wire is then folded to form a pair of relaxed portions 51 and 52 and additionally twisted to form loop 53 intermediate the two relaxed portions 51 and 52 so that the entire central portion 19 of the wire 18 fits within the notched portion 20 of the sheet 12 that lies over the interlayer sheet 16. The wire 18 is then electrically connected to the metal tab 22 at a solder or welding connection 56 which is intermediate relaxed portion 51 and loop 53 and at another solder or welding connection 58 which is intermediate relaxed portion 52 and loop 53.

The prepressed assemblies are then laminated in autoclaves at a temperature of about 275° to 300° Fahrenheit and a pressure of about 200 pounds per square inch for about 45 minutes. As an alternative, the laminating operation may be that disclosed in U.S. Pat. No. 2,948,645 to Keim, where the assembly is prepressed by removing fluid from the interfaces between the sheets comprising the assembly by evacuation through a flexible channel-shaped ring that encompass the assembly and then the assembly is laminated at elevated temperature and pressure with the ring removed.

The laminated assembly is mounted on a rack with the notched portion 20 facing upward. A transparent adhesive tape such as a polyurethane tape is applied to the outer surface of the notched glass sheet to form a transparent outer wall 30 for the chamber formed by the notched portion 20 in the sheet 12. A suitable fast setting electrical insulating material 32, such as a fast setting polysulfide resin sold under the tradename "Thiokol" by the Thiokol Chemical Company of Bristol, Pa., or a room temperature vulcanizable silicone such as 615 RTV silicone supplied by the General Electrical Company, Schenectady, New York, or Scotchcast 225 electrical resin sold by the Minnesota Mining and Manufacturing Company, St. Paul, Minnesota, is injection molded into the notched portion 20.

The transparent polyurethane tape wall 30 supports the injection molded material in the notched portion 20.

The electric circuit so formed is then tested. The plug 26 is inserted in a testing circuit for this test. This indicates whether a signal from the embedded wire will reach a radio circuit in sufficient strength to provide adequate reception. The assembly is then stored with other assemblies for sufficient time for the injection molded material to harden. Then the assembly is ready for final lamination.

EXAMPLE I

Preformed sheets of polyester polyurethane were made as follows:

Drums containing 450 lbs. (204 Kg.) of solid poly(1,4-butylene adipate) polyester having an average number calculated molecular weight of 2004, a hydroxyl number of 56.05 and containing 22 to 26 parts per million tin by analysis were heated to 170° F. to 210° F. (76.7° C. to 98.9° C.) for from one to ten days. The resulting liquid melts were transferred to a 300 gallon (1.14 cubic meters) glass lined kettle and agitated in said kettle. Water content was reduced to less than 400 parts per million by heating to about 215° F. (101.7° C.) under 2 millimeters of mercury pressure when necessary. Normally, reducing the water content is not necessary because the water content of the polyester in the drum is below 350 parts per million. The pressure was released while introducing pre-purified nitrogen, and 2.74 moles of 1,4-butanediol was added for each mole of adipate polyester to the agitated mixture of dried polyesters at 150° F. (65.6° C.) to produce a mixture containing 200 to 340 parts per million of water content. The resulting mixture was heated to 194° F.±2° F. (90° C.±1.1° C.). The resulting mixture of 900 pounds (408.24 Kg.) of polyester and 110.8 pounds 50.26 Kg.) of butanediol was homogeneous. A stream of this homogeneous mixture was mixed with a stream of 438.4 pounds (198.86 Kg.) of 4,4′methylene-bis-(cyclohexyl isocyanate) (equal in mols to 0.995±0.005 of the mols in the first mixture). The isocyanate had a stereoisomer content of 19 to 21 percent trans, trans, 17 to 18 percent cis, cis, and 62 to 64 percent cis, trans, and contained between 0.27 percent and 0.40 percent monoisocyanate, (Hylene W). The temperature of the isocyanate was 113° F.±1° F. (45° C±0.6° C.) when stored. All reagents were kept in a nitrogen atmosphere until mixed. The two streams were pumped into a mixer unit at approximately equal molar ratios and agitated at 173° F.±2° F. (78.3° C.±1.1° C.). A single stream of the mixture was continuously fed at a rate of about 6.7 pounds (3.04 Kg.) per minute into a series of 20 TEFLON coated pans (12 in. × 20 in. × 7 in.) (30.48 cm × 50.8 cm × 17.78 cm) which were moved on a conveyor within an oven containing a nitrogen atmosphere at 290° F. (143.3° C.). The temperature of the polymer in the pans rose temporarily to approximately 340° F. (171.1° C.) and then returned to about 290° F. (143.3° C.). The mix remained in the pans for approximately 30 hours in the oven at 290° F. (143.3° C.) until the reaction and polyurethane formulation was substantially complete. The resultant semi-solid polymer was allowed to cool to room temperature, removed, cut, ground and reheated to about 150° F. (65.6° C.) for 3 hours, and extruded into a continuous ribbon through an orifice about 40 inches (1016 mm) wide and 30 mils (0.762 mm) thick. The polymer that resulted had an inherent viscosity at 30° C. at a 0.5 percent concentration in chloroform of about 1.15±0.05 before extrusion and an NCO content of 0.05±0.02 percent. The inherent viscosity after extrusion was approximately the same. The continuous ribbon so formed was cut into rectangular sheets having an area sufficient to be trimmed to an outline conforming to that of the glass sheets to which it was to be laminated, an antenna wire having the desired configuration was embedded in each sheet using the apparatus depicted in U.S. Pat. No. 3,543,272 to Zawodniak, and after storage at 70° F. (21.1° C.) and 10 percent relative humidity, the sheets were assembled between two glass sheets of matching curvature, one of which had a notched portion as described previously.

Antenna windshields containing interlayers of preformed polyurethane sheets approximately 0.030 inch thick with embedded antenna wires laminated between a pair of tinted float glass sheets of nominal thickness of 3/32 inch were fabricated using the polyester type of polyurethane sheets that resulted from the fabrication steps recited in Example I to produce antenna windshields for General Motors cars having the so-called B-body used in certain Chevrolet, Oldsmobile and Buick models. The windshields were mounted in place on the windshield frame for each test and were tested for Q-value using a Type 260-A Boonton Radio Company Q-meter. The average Q-value for 5 test antenna windshields containing preformed polyester polyurethane interlayers was 118. This compared to an average Q-value of 99 for standard windshields identical to the test windshields that were tested under the same conditions, except for the incorporation of polyvinyl butyral interlayers in the standard windshields.

The aforesaid tests tended to establish that so-called trilayer windshields containing interlayers composed of a preformed polyurethane sheet sandwiched between two glass sheets had a significantly higher Q-value then conventional windshields having polyvinyl butyral interlayers.

Further experiments were performed with so-called bilayer windshields having only one glass shown in FIG. 4. The single glass sheet may be tempered as described in Belgian Pat. No. 785,126. The bilayer windshield of FIG. 4 comprised an outer notched sheet of glass 12 similar to that used in the embodiment of FIGS. 1 to 3, and an inner sheet of preformed polyester polyurethane 16 free of slits having an antenna wire 18 embedded near the surface facing glass sheet 12. The metal tab 22 adhered to the portion of the polyurethane sheet 16 that extended into the notched portion 20 of the outer glass sheet 12 and antenna wire 18 and lead-in wire 24 were attached to metal tab 22 in a manner similar to the attachments provided in the trilayer windshield of FIGS. 1 to 3. A fast setting electrical insulating material 32 was disposed in the notched portion 20 of outer glass sheet 12 between the polyurethane sheet 16 and the transparent outer wall 30 that enclosed the notched portion 20.

The bilayer antenna windshield is produced by assembling a notched outer glass sheet 12 with its concavely shaped surface facing upward and the preformed sheet 16 of polyurethane resin with the antenna wire 18 embedded therein adjacent the bottom surface of the resin sheet. Better radio reception is obtained with antenna bilayer windshields when the antenna wire is embedded in the preformed polyurethane sheet in the portion closer to the glass-polyurethane interfacial surface than when the antenna wire is embedded near the exposed surface of the polyurethane sheet of the bilayer antenna windshield.

In some cases, an adhesion promoting composition may be necessary to adhere the notched, outer glass sheet to the preformed polyurethane sheet.

Suitable material available commercially include the following: gamma-aminopropyltriethoxysilane, sold by Union Carbide Corporation under the trademark "A-1100" and Dow Corning under the trademark "Z-6020"; glycidyloxypropyltrimethoxy silane, sold by Dow Corning under the trademark "Z-6040"; and N-(beta-amino ethyl) gamma-aminopropyltrimethoxysilane, sold by Union Carbide Corporation under the trademark "A-1120". While the composition may be incorporated into the urethane reactants, it may also be applied externally to the polyurethane sheet material, but is preferably applied to the glass surface. An adhesion promoting composition may or may not be necessary depending upon the polymer employed when the polyurethane is extruded and/or calendered into a sheet such as when made by the "one-step" bulk polymerization method.

In some cases, an adhesion controlling agent or inhibitor may be necessary, such as the alkyl acid phosphates disclosed in Canadian Pat. No. 861,469. Particularly preferred are methyl acid phosphate and stearyl acid phosphate, which have been observed to effect a desirable controlled adhesion with excellent diaphragm action and glass retention when a laminate is broken. The inhibitors are generally added to the urethane reactants although in some cases they may be coated on the sheet material or glass layer. Only a minor amount of adhesion controlling agent is required, if at all, such as from about 0.00001 to about 0.1 percent by weight.

The assembly of the preformed polyurethane sheet and the notched glass sheet with an adhesion promoter or adhesion controller therebetween, if desired, is assembled as described previously with another glass sheet on the side opposite the preformed polyurethane sheet from the notched glass sheet.

A parting material is applied to the surface of the outer glass sheet prior to assembly. The parting material is preferably an organic silicon composition well known for parting material properties, such as an organic silicon coating produced by applying a liquid organic silicon composition to a glass surface and drying, then heating the coated glass surface for sufficient time (24 hours) at a temperature sufficiently high (250° F.) (121.1° C.) to cure the coating. The initial coating composition comprises an organopolysiloxane compound produced by the hydrolysis and condensation of at least one compound having the formula: $T_nSiZ_{(4-n)}$ wherein T independently generally represents a member such as alkyl, alkenyl and aryl, more specifically, methyl, ethyl and propyl through hexyl (both normal and isomeric forms), cyclopentyl, cyclohexyl, vinyl and the normal isomeric forms of propenyl through hexenyl and phenyl; Z independently represents a hydrolyzable group, more specifically a halogen (chlorine, bromine, fluorine and iodine), alkoxy (e.g., methoxy through heptoxy) and acyloxy (e.g., acetoxy, propionoxy, butyroxy, pentanoxy, hexanoxy, etc.) and aryloxy, e.g., phenoxy; and $n$ is a positive integer of less than 4 and preferably one. Preferred organosiloxane compositions adapted for use as initial coating compositions to be cured consist essentially of a solvent solution of alkoxysilane or a solution of a mixture of methyltrialkoxysilane and phenyltrialkoxysilane in which the alkoxy group contains less than five carbon atoms. The curable organopolysiloxane compositions and their methods of preparation are disclosed in U.S. Pat. No. 3,451,838 to Alfred J. Burzinski et al. and in U.S. Pat. No. 3,460,980 to Alfred J. Bursinski. Other suitable parting materials are disclosed in U.S. Pat. Nos. 3,002,946 to Thomas (phenyl methyl siloxane resin compositions) and 3,015,637 to Rauner and Tyler (organo siloxane-alkyl resin coating compositions).

After the two glass sheets are assembled wih the adhesion promoter on the surface of the notched glass sheet facing one surface of the preformed polyurethane sheet and the parting material baked onto the surface of the other glass sheet facing the other surface of the preformed polyurethane sheet, the assembly is wrapped in polyvinyl fluoride plastic and the plastic-wrapped assembly inserted within a so-called "polymar" bag of the type disclosed in U.S. Pat. No. 3,311,517 to Keslar and Rankin. The bag comprises an outer ply of polyethylene glycol terephthalate and an inner ply of polyethylene bonded thereto. The bag is evacuated, sealed and inserted within a second similar bag which is also evacuated and sealed.

The sealed unit is placed in an oil autoclave and subjected to a pressure of 200 psi (585.28 Kg/cm$^2$) at 275° F. to 300° F. for 45 minutes. The unit is then cooled to room temperature while maintaining the elevated pressure. Then, the pressure is reduced, the unit removed from the autoclave and the bags opened. The glass sheet coated with the parting material is separated from the remainder of the assembly, which constitutes a bilayer laminated assembly comprising the preformed polyurethane sheet and the notched glass sheet.

The metal tab 22 is applied to the polyurethane layer 16 and the looped portion 19 of the antenna wire 18 twisted and soldered to the metal tab 22 as in the trilayer windshield of FIGS. 1 to 3. The lead-in wire 24 and the plug 26 are connected to the tab 22 as in the previous embodiment. The bilayer antenna windshield so produced is ready for testing using a Q-meter after its installation in position in the windshield frame of an automobile.

A 1972 Cadillac was used to test the relative merits of a bilayer windshield of the type depicted in FIG. 4 containing an inner sheet 30 mils (0.762 mm) thick of polyurethane prepared as in Example I and an outer float glass sheet one-eighth inch (3.175 mm) thick. The original antenna windshield installed in the Cadillac was a trilayer windshield comprising two glass sheets, each approximately 100 mils (2.54 mm) thick, and a polyvinyl butyral interlayer 30 mils (0.762 mm) thick. Under the same test conditions using the type 260-A Boonton Company Q-meter, the original antenna windshield had a Q-value of 69, whereas the bilayer antenna windshield tested had a Q-value of 116. Furthermore, listening tests based on AM radio reception indicated a marked improvement for the test bilayer antenna windshield over the reception using the original antenna windhield. Another indication of unexpected improvement came from another test in which the radio was tuned to a station producing a weak signal that could not be heard when the original antenna windshield was in place. However, the experimenter was able to hear the signal from the weak station when the bilayer antenna windshield was connected in an identical arrangement to the automobile radio.

Since the experiments reported previously encouraged the belief that antenna windshields having their antenna wires embedded in polyurethane were superior to otherwise identical antenna windshields having their antenna wires embedded in polyvinyl butyral, a more extensive series of experiments was performed using the Type 260-A Boonton Radio Company Q-meter for Q-value measurements.

A test auto (Chevrolet station wagon) was located in a given position for all the following measurements reported. The test automobile had a standard antenna windshield comprising two sheets of float glass having a nominal thickness of 3/32 inch (2.38 mm) per sheet, an interlayer of polyvinyl butyral 0.030 inch (0.762 mm) thick having a standard metal antenna wire 0.005 inch (0.127 mm) thick enclosed in enamel embedded in the interlayer. Before its removal to allow tests of other windshields, the installed antenna windshield was tested in its installed position in the automobile with a rear view mirror supported on a mirror bracket. The latter was bonded to the inner surface of the installed windshield. The installed standard trilayer antenna windshield had a measured Q-value of 105 with the mirror and bracket installed and a measured Q-value of 107 after the mirror was removed, leaving the mirror bracket bonded to the installed windshield.

Seven sets of bilayer and trilayer windshields of the size and shape conforming to the windshield opening of the test auto (Chevrolet station wagon) were prepared. Each set comprised five windshields of the same configuration. The Q-value of each windshield was measured on three different non-consecutive occasions by placing the windshield in the portion it would occupy in the windshield receiving frame of the test automobile, taking the readings needed for a determination of Q-value, removing the windshield and doing likewise for several other windshields tested for Q-value before a second or third Q-value determination was made for each windshield tested.

In each case, the bilayer windshields had one glass sheet laminated to a sheet of polyurethane or polyvinyl butyral, whereas the trilayer windshields had two glass sheets laminated to a sheet of polyurethane or polyvinyl butyral. Each glass sheet in the windshields tested had a nominal thickness of 3/32 inch (2.38 mm) and each sheet of polyvinyl butyral or polyurethane had a nominal thickness of 0.030 inch (0.762 mm). The polyurethane sheets were prepared as described in Example I. All the antenna windshield sets had standard copper wire 5 mils (0.127 mm) thick coated as described previously except for one special set which used bare copper wire for the antenna wire.

One set of trilayer antenna windshields with standard polyvinyl butyral interlayers and mirror bracket but no mirror had an average Q-value of 106 compared to 107 for the Q-value of the antenna windshield orginally installed in the test automobile. A set of trilayer windshields having extra dry polyvinyl butyral as their interlayers had an average measured Q-value of 118 for a set of 15 independent readings when tested without mirror brackets. A set of bilayer antenna windshields containing polyvinyl butyral had an average measured Q-value of 121 under the same test conditions.

By comparison, a set of bilayer windshields containing polyurethane had an average measured Q-value of 149 without a mirror bracket, 147 when retested with a mirror bracket installed in its usual position but without a mirror and 134 when tested again with both bracket and mirror attached in the customary position. These measurements showed an unexpected benefit in Q-value when polyurethane is used instead of polyvinyl butyral in bilayer windshields.

In the above bilayer windshields, the plastic sheets (polyvinyl butyral or polyurethane) were oriented with the embedded antenna wires on the side facing the glass sheet. Another set of bilayer antenna windshields having the polyurethane layer oriented so that the standard antenna wire was close to the surface facing away from the glass sheet was tested without mirror brackets and showed an average measured Q-value of only 104 compared with 149 for similar bilayer antenna windshields in which the standard antenna wire was embedded close to the the surface facing the glass sheet. This test indicated the advisability of orienting the polyurethane sheet properly with the embedded antenna wire disposed closer to the surface facing the outer glass sheet of the bilayer.

Still another set of bilayer antenna windshields was made with bare copper wire 5 mils (0.127 mm) thick substituted for the standard coated antenna wire. The average measured Q-value for the bilayer antenna windshields having bare antenna wire was 141 compared with a Q-value of 149 for the same structure provided with the standard antenna wire.

Further tests were performed to measure the Q-value of 20 different trilayer windshields of a pattern known as Fisher 1191 for a test automobile. There were 10 windshields having polyvinyl butyral interlayers and 10 windshields having polyurethane interlayers in the group. Each windshield had an outer glass sheet and an inner glass sheet. Five windshields having each type of interlayer were laminated with the antenna wire embedded in the interlayer completely to one side of the midplane of the interlayer at or just below the surface facing the outer glass sheet as depicted in FIG. 4, and the other five windshields having each type of interlayer were laminated with the antenna wire embedded in the interlayer completely to the other side of the mid-plane of the interlayer at or just below the surface facing the inner glass sheet as depicted in FIGS. 3 and 5.

The test automobile was parked in a preselected location and was not moved therefrom during the Q-value determinations for all 20 windshields. Each windshield was mounted twice in the position it normally occupies in the automobile and its Q-value measured for each mounting. The windshields each had antenna wires 5 mils (approximately 0.127 mm) thick and were of standard thickness with each glass sheet having a nominal thickness of 3/32 inch (approximately 2.38 mm) and each interlayer having a nominal thickness of 0.030 inch (approximately 0.762 mm). The wires were embedded slightly below a surface of the interlayer.

The average Q-value of the trilayer antenna windshields with polyvinyl butyral interlayers was 83.6 compared to 101.9 for those having polyurethane interlayers. This difference in average Q-values was deemed significant.

A comparison of the two sets of trilayer antenna windshields having interlayers of polyvinyl butyral showed no significant difference in the average Q-value of the windshields having the antenna wires embedded near the surface facing the outer glass sheet of the windshield (average Q-value 82.6) compared to those embedded in the interlayer near the surface facing the inner glass sheet of the windshield (average Q-value 84.6). However, the laminated antenna windshields containing the antenna wires embedded in the polyurethane interlayers showed a significant difference in average Q-value when the position of the embedded antenna wire differed. The antenna windshields with the antenna wire embedded in the polyurethane interlayer near the surface facing the outer glass sheet had an average Q-value of 97.3 compared to an average Q-value of 106.4 for the antenna windshields having the antenna wire embedded in the polyurethane interlayer near the surface facing the inner glass sheet. This difference was significant and was totally unexpected in view of the results obtained with the earlier experiments with trilayer antenna windshields having the antenna wire embedded near either surface of a polyvinyl butyral interlayer.

The conclusions drawn from the extended experiments performed are:

1. Average measured Q-values of installed trilayer windshields having antenna wires embedded in polyurethane interlayers are higher than those of installed standard production trilayer antenna windshields having identical antenna wires embedded in polyvinyl butyral.

2. Bilayer antenna windshields of glass and polyurethane installed with the glass facing outward and having antenna wires embedded in the polyurethane layer adjacent the surface facing the glass sheet have higher average measured Q-values than similarly installed bilayer antenna windshields having the polyurethane layer oriented with the embedded antenna wire closer to the polyurethane surface facing away from the glass sheet.

3. Trilayer glass-polyurethane installed windshields with the antenna wire embedded in the polyurethane layer nearer the surface facing the inner glass sheet have significantly higher average measured Q-values than installed trilayer glass-polyurethane windshields where the antenna wire is embedded nearer the surface facing the outer glass sheet, whereas there is no significant difference in average measured Q-values for trilayer windshields having polyvinyl butyral interlayers supporting the wire near either glass sheet.

4. Bilayer glass-polyurethane antenna windshields have higher average measured Q-values when standard copper wire encased in a nonconducting sheath is used as the antenna wire than similar windshields using bare copper wire for the antenna wire.

While the laminated antenna windshields described as illustrative embodiments of the present invention incorporate one or two glass sheets laminated to a preformed sheet of polyurethane that serves as a carrier for an elongated electroconductive element, such as a single antenna wire, it is understood that the preformed polyurethane sheet may be used as a carrier for an antenna comprising a plurality of wires instead of the single continuous wire antenna disclosed.

The results of the various experiments are recorded in Table II.

TABLE II

| TYPE | EFFECT OF DIFFERENT FACTORS ON Q-VALUE FACTOR COMPARED | Q-VALUE |
|---|---|---|
| Trilayer | Polyvinyl butyral (PVB) vs polyurethane (PU) | 99 118 |
| Cadillac | Polyvinyl butyral trilayer vs polyurethane bilayer | 69 116 |
| Polyurethane | Bilayer vs Trilayer | 149 118 |
| Polyvinal butyral Trilayer | Standard PVB moisture content vs very dry PVB moisture content | 106 118 |
| Bilayer without mirror bracket | Polyvinyl butyral vs polyurethane | 121 149 |
| Bilayer with empty mirror bracket | Polyvinyl butyral vs polyurethane | 106 147 |
| Bilayer with bracket and mirror | Polyvinyl butyral vs polyurethane | 105 134 |
| Polyurethane bilayer | Antenna wire oriented near glass vs antenna wire oriented away from glass | 149 104 |
| Polyurethane bilayer | Standard coated antenna wire vs uncoated antenna wire | 149 141 |
| Polyvinyl butyral Trilayer | Antenna wire nearer outer glass vs antenna wire nearer inner glass | 82.6 84.6 |
| Polyurethane Trilayer | Antenna wire nearer outer glass vs antenna wire nearer inner glass | 97.3 ($\sigma = 1.9$) 106.4 ($\sigma = 3.8$) |

The form of the invention shown and described in this specification represents illustrative embodiments thereof. It is understood that various changes will become evident to those skilled in the art and that these changes may be made without departing from the spirit of the present invention as defined by the claimed subject matter that follows.

We claim:

1. A transparent antenna windshield comprising one sheet of glass, a preformed sheet of thermoplastic polyurethane laminated to the inner surface of said glass sheet, and an antenna consisting essentially of elongated electroconductive wire embedded in said polyurethane sheet and adapted for coupling to a radio for use as an antenna circuit element, wherein said windshield is a bilayer windshield having a single sheet of glass disposed outward of said preformed sheet of thermoplastic polyurethane, and said embedded electroconductive element is located within the thickness of said preformed sheet in closer relation to said inner surface of said one sheet of glass than said other major surface of said preformed sheet.

2. An antenna windshield as in claim 1, wherein said glass sheet has a thickness of 50 to 250 mils (1.27 to 6.35 mm), said polyurethane sheet has a thickness of 5 to 60 mils (0.127 to 1.524 mm), and said wire has a thickness of 0.1 to 5 mils (0.00254 to 0.127 mm), but sufficiently less than that of said polyurethane sheet to have the wire embedded completely to one side of the mid-plane of said polyurethane sheet.

3. An antenna windshield as in claim 1, wherein said wire is encapsulated in a non-electroconductive sheath that is impervious to moisture.

4. An antenna windshield as in claim 1, wherein said glass sheet is chemically tempered.

* * * * *